May 12, 1964 D. H. BURNS 3,133,151

TELESCRIBER STYLUS ARRANGEMENT

Filed Feb. 27, 1961

3,133,151
TELESCRIBER STYLUS ARRANGEMENT
David H. Burns, Los Angeles, Calif., assignor to Telautograph Corporation, Los Angeles, Calif., a corporation of Virginia
Filed Feb. 27, 1961, Ser. No. 91,715
3 Claims. (Cl. 178—18)

This invention relates to a stylus and more particularly to an improved stylus arrangement suitable for use in a telescribing system.

Generally in telescribing systems, information manually written at a transmitter location is reproduced at a receiver location. More particularly at the transmitter location information is written by manually moving a stylus arrangement over a writing surface. The movement of the stylus arrangement is converted by transducer means coupled to the stylus arrangement into electrical signals indicative of the movements utilized in writing the information. The electrical signals are then transmitted from the transmitter to the receiver location. When received at the receiver location, the electrical signals are converted by transducer means located at the receiver location into mechanical energy which is utilized to control the movement of a stylus arrangement to reproduce the information written at the transmitter location.

In telescribing systems it is frequently desirable that the transmitter and receiver locations be capable of both transmitting and reproducing written information. This may be accomplished by providing a stylus arrangement at each location that includes writing tip and an implement held in the hand for guiding the motion of the writing tip. However, when such stylus arrangement is receiving an electrical signal, it is desired that the stylus arrangement require a minimum of mechanical energy to control its motion in reproducing the information written at the transmitter location. Accordingly, when the stylus arrangement is reproducing written information, it should have as small a mass as possible. Further, to prevent undue wear or damage to the coupling arrangement between the stylus arrangement and its associated transducer, the stylus arrangement should have a center of mass which will not shift in position relative to the stylus arrangement when its movement is being controlled to reproduce written information. Since the hand implement is not being utilized when the stylus arrangement is reproducing written information, it acts to increase the necessary mass of the stylus arrangement. Further, when the stylus arrangement is being moved, the hand implement may shift relative to the writing tip, thereby shifting the center of mass of the stylus arrangement. Thus, it is desired that the hand implement be removable from the stylus arrangement when the stylus arrangement is reproducing written information.

Further, in telescribing systems it is desired that the writing performed by a stylus arrangement represent an accurate sample of the operator's actual handwriting. Accordingly, the stylus arrangement should provide a writing position for the hand held implement which is natural and comfortable to the operator. Further, a stylus arrangement should allow the operator to write using the same muscular patterns as used in writing with a pen or pencil. To accomplish this, a stylus arrangement should allow substantially free movement of the writing tip over the writing surface and at the same time afford a clear vision of the point of contact of the writing tip with the writing surface. Further, to allow an operator to write in his natural style, the hand held implement associated with the stylus arrangement should be allowed substantially free angular movement relative to the contact point made by the writing tip with the writing surface.

In view of the above, the present invention provides a stylus arrangement including a stylus member and a removable hand piece which, when operating to write information on a writing surface, provides clear vision and substantially free movement of the stylus member over the writing surface, thereby allowing an operator to write in his natural style utilizing the same muscular patterns as used in writing with a pencil or pen. Further, when utilized to reproduce written information, the present invention provides a stylus arrangement which requires a minimum of mechanical force for operation and does not have a center of mass which shifts its relative position with movement of the stylus member.

Briefly, to accomplish the above, the present invention provides a stylus member positioned for movement into and out of contact with a writing surface. In a basic form the stylus member includes a pen arm which is normally supported above a writing surface and a pen point coupled to the pen arm. The pen point is so positioned that it makes contact with the writing surface when a downward vertical force is applied to the pen arm. To guide the motion of the stylus member over the writing surface, a hand piece is coupled to the stylus member such that one end of the hand piece is positioned in a common vertical plane with the pen point. In accordance with the present invention, the hand piece is removable from the pen arm.

In a preferred embodiment of the present invention, the hand piece is coupled to the stylus by a ball and socket coupling means. This coupling means allows the hand piece to freely guide the motion of the stylus member over the writing surface, maintain the hand piece in contact with the pen arm when writing, and allow the hand piece to be removed from the stylus member when the stylus arrangement is reproducing written information.

More particularly in the preferred embodiment of the invention a hemispherical socket is fixedly coupled to the pen supporting arm such that the center of the socket lies in a vertical plane with the pen point. Further, the hand piece is terminated in a ball which is constructed to fit in a mating relationship within the socket. Accordingly, the hand piece is permitted substantially free angular movement in relation to the pen point, thereby allowing the operator to position the hand piece at any desired angle relative to the writing surface when writing. Due to the ball and socket coupling, motion of the hand piece guides the pen point over the writing surface. Further, due to the ball and socket coupling, the hand piece may be easily removed from the socket connection.

In order that the writing with the stylus arrangement of the present invention might be completely natural, a hand rest is positioned in a horizontal plane substantially parallel with the pen supporting arm. More particularly, the hand rest is positioned such that when the pen point is in contact with the writing surface the ball terminating the hand piece and the hand rest are in a horizontal plane. Accordingly, when writing with the stylus arrangement, the motions made by the operator's hand are precisely those that he would make when writing on a surface lying in the horizontal plane.

The above, as well as other features of the present invention, may be more clearly understood by reference to the following detailed description when considered with the drawing, in which.

Figure 1:
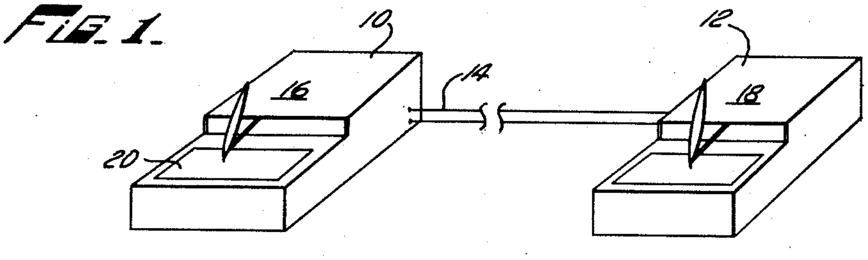
FIG. 1 is a perspective view of telescribing apparatus in which the present invention may operate.

Referring to FIG. 1 there is represented a telescribing system in which the present invention may function. As shown, the telescribing system includes telescribing apparatus 10 and 12 interconnected by a pair of wires 14. Further, the telescribing apparatus 10 and 12 include stylus arrangements represented at 16 and 18 respectively.

In operation, movements of the stylus arrangement 16 to write information on a writing surface 20 are converted by transducer means associated with telescriber apparatus 10 into electrical signals indicative of such movements. These electrical signals are in turn transmitted over the pair of wires 14 to the telescriber apparatus 12. At the telescriber apparatus 12 these electrical signals are converted by transducer means (not shown) into mechanical energy which is utilized to guide the motion of the stylus arrangement 18 to reproduce the information written by the stylus arrangement 16.

Telescribing systems of the type illustrated in FIG. 1 are well known. For example, such a system is described in U.S. Patent 2,904,631 issued September 15, 1959, to C. F. Anderson, et al.

Figures 2, 3:
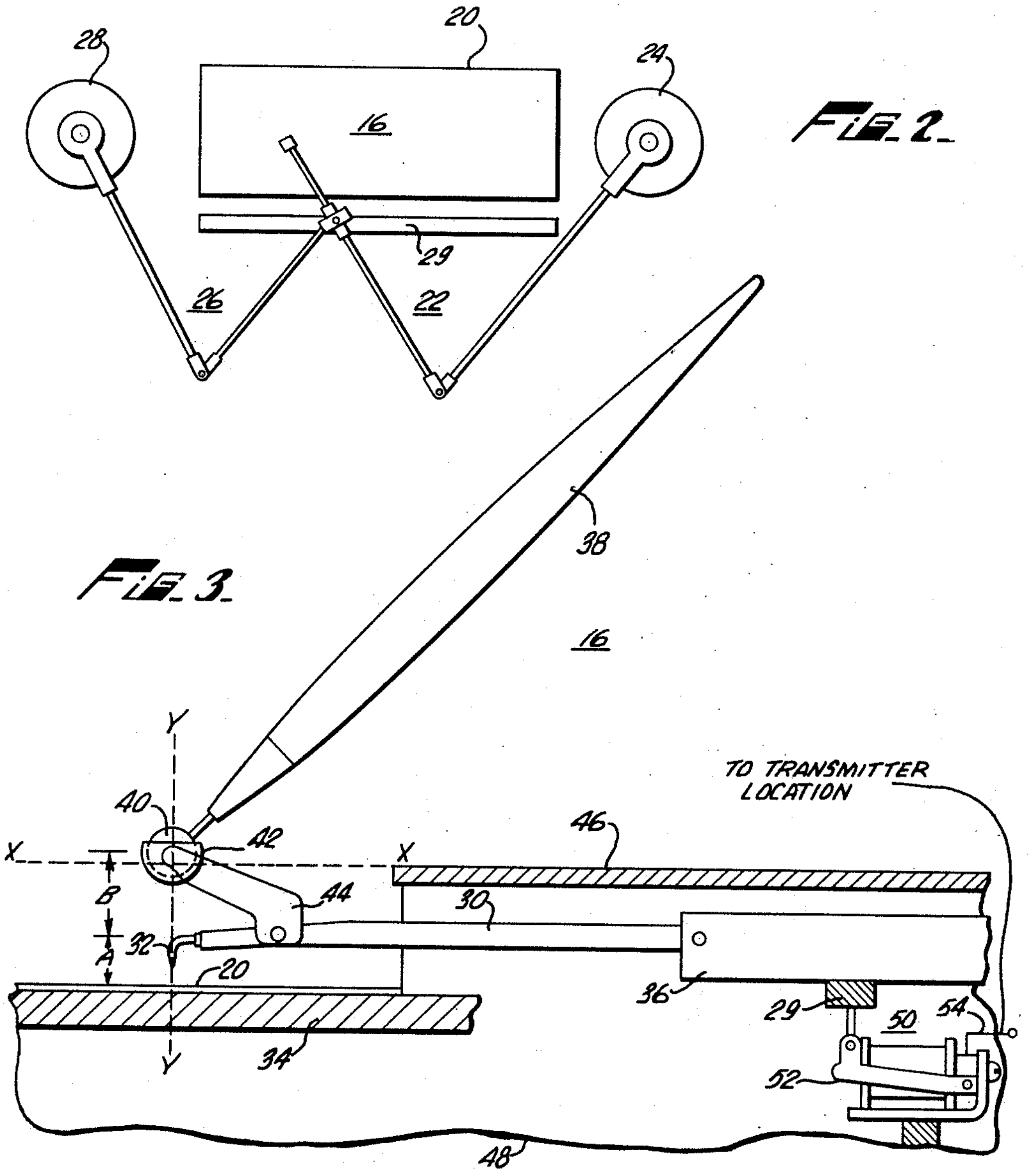
FIG. 2 is a plan view of a linkage arrangement for a telescribing system with which the present invention may be utilized.
FIG. 3 is a diagrammatic representation of the stylus arrangement in accordance with a preferred embodiment of the present invention.

As described in connection with FIG. 1, the movement of the stylus arrangement 16 is converted by a transducer means into electrical signals. In general such transducer means are directly coupled to the stylus arrangement. One example of such a coupling arrangement is illustrated in FIG. 2. As shown, the coupling arrangement comprises a well known W linkage with which the stylus arrangement of the present invention may be utilized. Such a linkage arrangement is described in detail in the above-mentioned U.S. Patent 2,904,631. Briefly, however, the stylus arrangement 16 is directly coupled to movable arm arrangement 22 which in turn is connected to a transducer means illustrated at 24. The transducer means 24 functions to convert the movement of the arm arrangement 22 into electrical signals. Accordingly, the transducer means 24 may take a number of forms well known to those skilled in the art. For example, it may include a rotatable shaft to which is coupled the movable arm of a variable resistor. In this form, rotation of the shaft may control the amount of the current flowing through the variable resistor, thereby producing a signal which is an accurate indication of the position of the arm arrangement 22. Still further to control the positioning of the stylus arrangement 16 when it is being utilized to reproduce written information, the transducer means 24 may include a motor drive which is controllable by electrical signals generated from a transmitter location.

As represented in FIG. 2, the stylus arrangement is also coupled to a support arm arrangement 26. Arm arrangement 26 is in turn connected to a transducer means illustrated at 28. As described in connection with the transducer means 24, the transducer means 28 functions to convert the motion of the arm arrangement 26 into electrical signals. Accordingly, the electrical signals developed by the transducers 24 and 28 define the position of the stylus arrangement 16 over the writing surface 20 and may be utilized to control the position of a stylus arrangement such as 12 of FIG. 1 to accurately reproduce the information written by the stylus arrangement 16.

As is further represented in FIG. 2 a support member 29 is included to move the stylus arrangement 16 perpendicularly to the writing surface 20. As will be described in detail in connection with FIG. 3, the support member 29 operates to control the movement of the stylus arrangement 16 into and out of contact with the paper when it is being utilized to reproduce written information.

Referring now to FIG. 3, there is illustrated a stylus arrangement in accordance with a preferred embodiment of the present invention. As represented, the stylus arrangement 16 of the present invention includes a stylus member which comprises a pen supporting arm 30 and a pen point 32. The pen arm 30 is positioned in a horizontal plane substantially parallel to the writing surface 20 which rests on a support plate 34. As illustrated, the pen supporting arm 30 is coupled to a support arm 36 of an arm arrangement, such as 22 illustrated in FIG. 2. As represented in FIG. 3, means are provided for normally urging the pen supporting arm 30 a distance A above the writing surface 20. This means may take a number of different forms. However, by way of example, it is illustrated as including the support member 29. More particularly, the support member 29 extends beneath the support arm 36 to provide upward support for the support arm 36 and the pen supporting arm 30. Accordingly, since the support arm 36 is coupled to an arm arrangement such as 22, which is in turn fixedly supported at a transducer means, the support member 29 and the pen supporting arm 30 provide a type of cantilever spring arrangement. Thus, the pen supporting arm 30 is normally maintained a distance A above the writing surface 20 and will raise and lower relative to the writing surface 20 in response to vertical forces applied thereto. Accordingly, the pen point 32, being coupled to the pen supporting arm 30, is normally positioned away from the writing surface 20 such that it makes contact with the writing surface 20 only when a downward vertical force is applied to the pen supporting arm 30.

In practicing the present invention the writing surface 20 and the pen point 32 may take a number of different forms. For example, the writing surface 20 may be paper and the pen point 32 may be an ink pen point having an ink cartridge enclosed in the pen supporting arm 30.

As illustrated in FIG. 3, the stylus arrangement 16 further includes a hand piece 38 to guide the motion of the stylus member over the writing surface 20. As shown, the hand piece 38 is terminated in a substantially smooth ball 40. To couple the hand piece 38 to the stylus member a hemispherical socket 42 and a support member 44 are provided. More particularly, one end of the support member 44 is fixedly coupled to the pen supporting arm 30 and the other end fixedly coupled to the socket 42. As represented, the socket 42 and the support member 44 are so positioned that the center of socket 42 lies a distance B above the pen arm 30 and in a vertical plane Y—Y with the pen point 32.

As represented, the ball 40 is positioned in a mating relationship within the socket 42. Accordingly, angular motion of the hand piece 38 is permitted around the center of socket 42, thereby allowing an operator to position the hand piece 38 at any angle while writing. Further, due to the mating relationship between the ball 40 and the socket 42, the motion of the hand piece 38 guides the pen point 32 over the writing surface 20.

As further represented in the drawing, the stylus arrangement may include a hand rest 46. As shown, the hand rest 46 is positioned in a horizontal plane parallel to the pen arm 30 and is held in fixed relation to the writing surface support plate 34 by the frame of a telescribing machine, a portion of which is indicated at 48. More particularly, the hand rest 46 is so positioned that when a vertical force is applied to the pen arm 30 and the pen point 32 is contacting the writing surface 20, hand rest 46 lies in a horizontal plane X—X with the center of socket 42.

Accordingly, when an operator is operating the stylus arrangement, he rests his hand on the hand rest 46 and holds the hand piece 38 as he would any pen or pencil. By applying writing pressure to the hand piece 38, the pen arm 30 is lowered until the pen point 32 contacts the writing surface 20. As mentioned above, this brings the center of socket 42 into plane X—X with the top of hand rest 46. The operator may now write on writing surface 20 in his normal style utilizing the same muscular patterns as he would in writing with a pen or pencil. Due to the ball and socket coupling combination, the hand piece 38 remains in contact with the socket 42 to guide the motion of the stylus member over writing surface 20 so long as the ball 40 is not raised above the writing surface 20 in the vertical plane Y—Y a distance greater than the sum of distances A and B. Accordingly, the hand piece 38 continues to guide the stylus member in all normal writing movements including the dotting of "i's" and the crossing of "t's." In particular, the motions made by the operator's hand are precisely those which he would make in writing with a pencil or pen upon a writing surface lying in horizontal plane X—X.

Further, due to the relative positioning of the hand rest 46, the pen point 32 and the writing surface 20, the operator has a clear view of the pen point 32 as it contacts the writing surface 20, thus permitting general positioning control of the pen point 32 by the eye of the operator.

As previously mentioned and in accordance with the present invention, when the stylus arrangement is being utilized at a receiver location to reproduce written information, the hand piece 38 may be removed from socket 42. This is accomplished by raising the ball 40 in vertical plane Y—Y a distance above the writing surface 20 which is greater than a sum of the distances A and B. Accordingly, when reproducing written information, the stylus arrangement includes the pen arm 30, the pen point 32, and the support member 44 with the socket 42 coupled thereto. Thus, the stylus arrangement when reproducing written information has a minimum of mass having a center which will not shift relative to the stylus arrangement with movement of the stylus member.

Further, when the stylus arrangement 16 is utilized to reproduce written information, it is necessary to lower the pen point 32 into writing contact with the writing surface 20 thereby allowing the electric signals generated at a transmitter location to control the movement of the stylus arrangement 16 to reproduce written information. As described briefly in connection with FIG. 2, the support member 29 is utilized to provide such control of the pen point 32. In particular, as shown in FIG. 3, there is included means for lowering the support member 29 when the stylus arrangement 16 is to be utilized to reproduce written information. As illustrated, this means for lowering the support member 29 may include a solenoid 50. As represented, the solenoid 50 is so positioned that its armature 52 provides support for the support member 29. Accordingly, when an appropriate signal is received over lead 54 from a transmitter location, solenoid 50 will operate allowing armature 52 to lower the support member 29. Since as shown in FIG. 3 the support arm 36 rests on the support member 29, when support member 29 is lowered the pen supporting arm 30 and the pen point 32 will also be lowered. Accordingly, the pen point 32 makes contact with the writing surface 20, thereby readying itself to reproduce written information.

What is claimed is:

1. In a telescoping system in which mechanical movements are converted by transducer means into electrical signals indicative of said movements, the combination comprising: a pen arm coupled to said transducer means; a pen point coupled to said pen arm; support means contacting said pen arm for normally urging said pen point out of contact with a writing surface; and electromechanical means for moving said support means out of contact with the pen arm to allow said pen point to make contact with said writing surface.

2. In a telescribing system in which mechanical movements are converted by transducer means into electrical signals indicative of said movements, the combination comprising: a pen point; a pen arm connected to said pen point; a support member positioned under said pen arm for supporting said pen arm above said writing surface; and means responsive to electrical signals for lowering said support means to allow said pen point to make contact with said writing surface.

3. In a telescribing system in which mechanical movements are converted by transducer means into electrical signals indicative of said movements, the combination comprising: a pen arm; a pen point coupled to said pen arm coupled to said transducer means, a support member contacting said pen arm to normally position said pen arm over a writing surface and said pen point out of contact with said writing surface means responsive to electrical signals for moving said support member out of contact with said pen arm to allow said pen point to make contact with said writing surface; a hemispherical socket coupled to said pen arm and positioned above said pen point in a common vertical plane; and a hand piece having one end terminated in a ball, said ball being movable into said hemispherical socket for translating guiding motion to said pen arm.

References Cited in the file of this patent

UNITED STATES PATENTS

| | | |
|---|---|---|
| 2,937,917 | Anthony | May 24, 1960 |
| 2,995,623 | Scheuzger | Aug. 8, 1961 |

UNITED STATES PATENT OFFICE

CERTIFICATE OF CORRECTION

Patent No. 3,133,151 May 12, 1964

David H. Burns

It is hereby certified that error appears in the above numbered patent requiring correction and that the said Letters Patent should read as corrected below.

Column 6, line 10, for "telescoping" read -- telescribing --.

Signed and sealed this 24th day of November 1964.

(SEAL)
Attest:

ERNEST W. SWIDER
Attesting Officer

EDWARD J. BRENNER
Commissioner of Patents